Jan. 3, 1956  C. E. HALE  2,729,502
CONVERTIBLE TOP LINKAGE AND ACTUATING MECHANISM
Filed Oct. 6, 1952  2 Sheets-Sheet 1
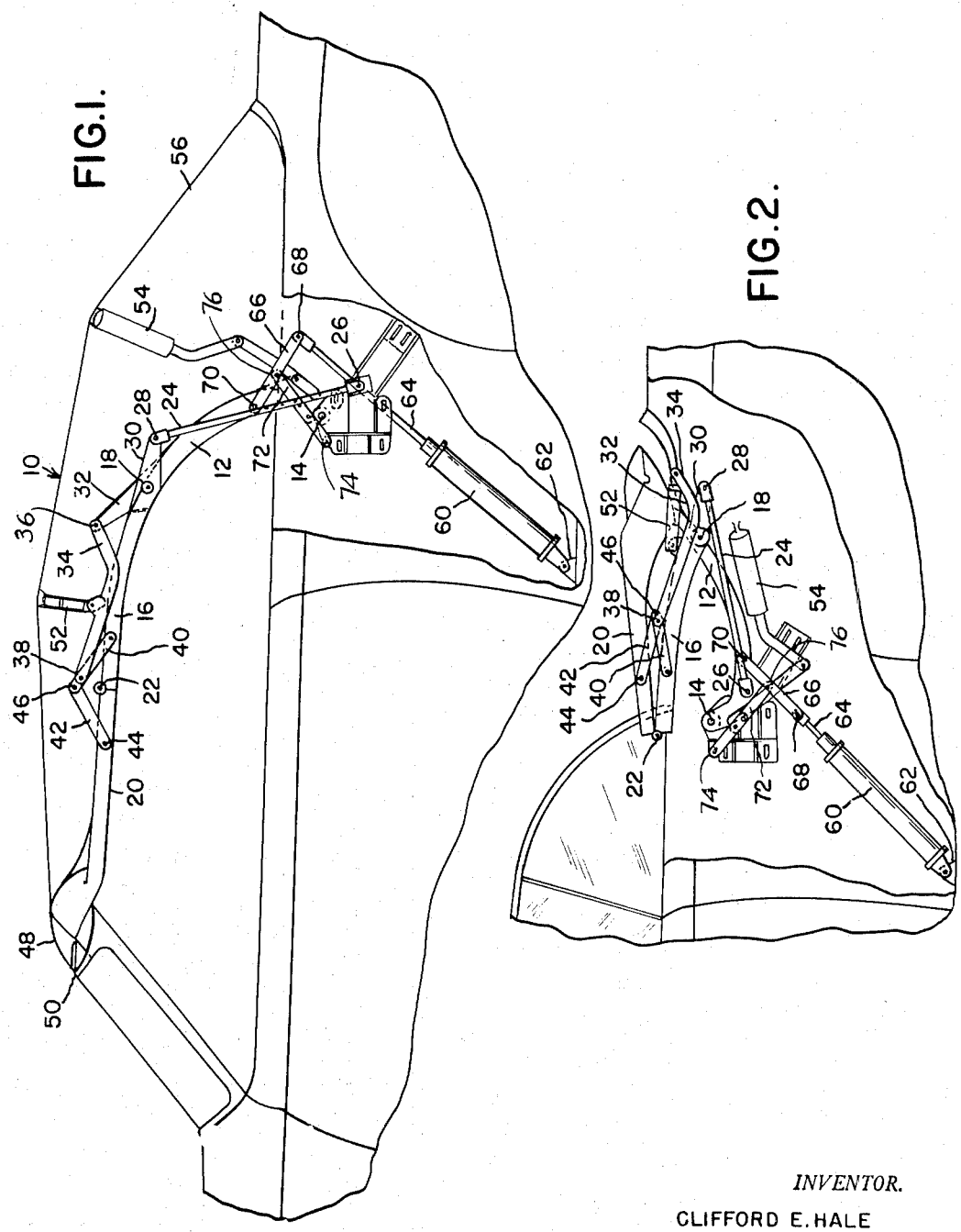
INVENTOR.
CLIFFORD E. HALE
BY Whittemore,
Hulbert & Belknap
ATTORNEYS

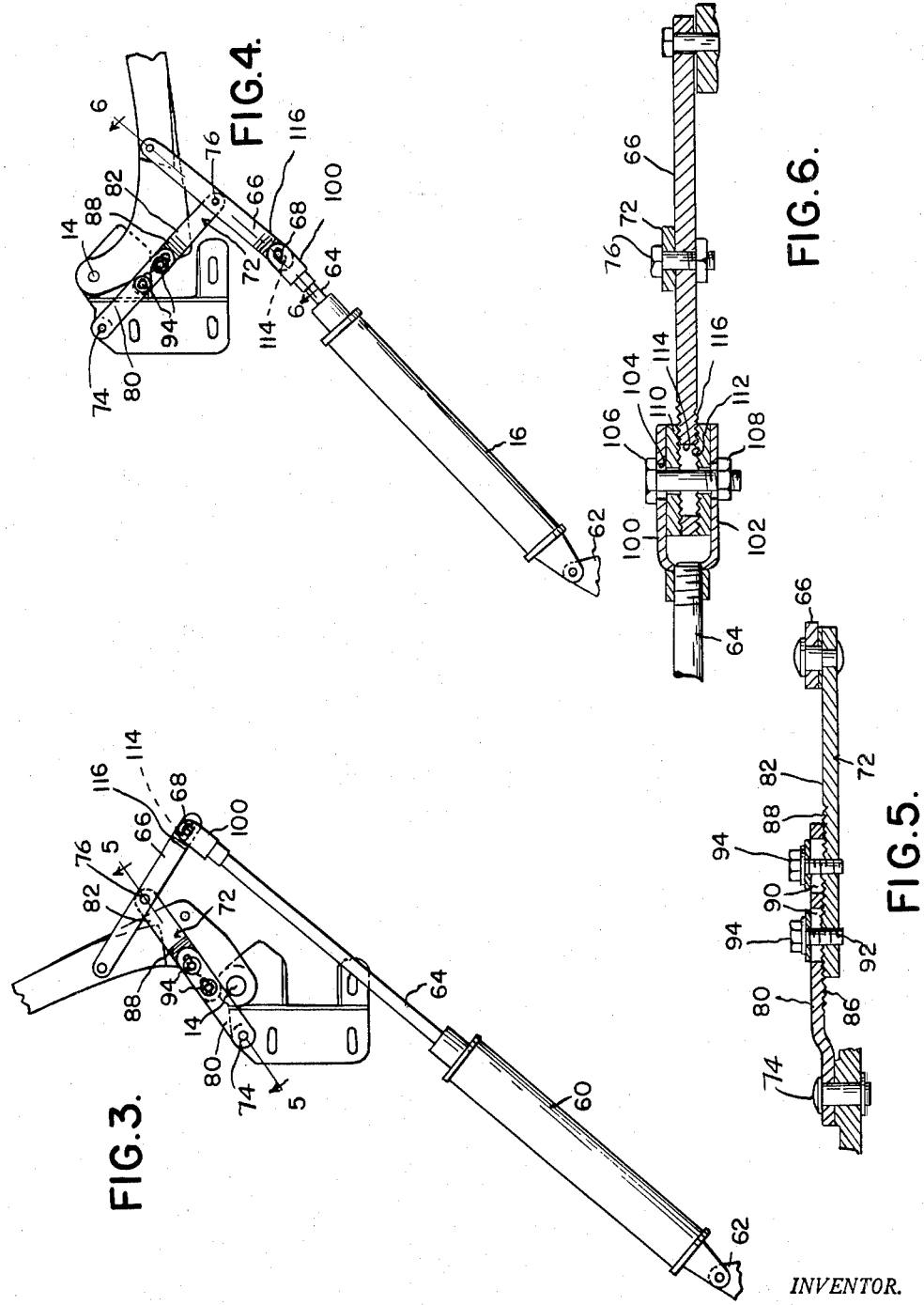

United States Patent Office 2,729,502
Patented Jan. 3, 1956

2,729,502

CONVERTIBLE TOP LINKAGE AND ACTUATING MECHANISM

Clifford E. Hale, Ypsilanti, Mich., assignor to Detroit Harvester Company, Detroit, Mich., a corporation of Michigan Application October 6, 1952, Serial No. 313,261

6 Claims. (Cl. 296—117)

The present invention relates to a convertible top and more particularly, to adjustable means for connecting a power unit to the convertible top so as to move the folding top structure between definite predetermined limits. Prior to the present invention power units have been designed to allow over-travel of the power unit at both ends of the stroke. This over-travel was to assure a stroke long enough to compensate for manufacturing variations in the distances from the power unit mounting point to the power application point on the folding top. Therefore, in most cases, the power unit would over-travel, causing overshooting of the windshield by the folding top header and misalignment of the folding top side rail over the door and quarter window glasses. This overshooting and misalignment would place undue strain on the whole top and body of the automobile. The strain was particularly severe when the header had been secured to the windshield by the locks normally provided. In some cases it has been severe enough to permanently distort and force out of position the windshield portion of the body.

Over-travel when the top is in folded position also placed undue strain on the folding top and automobile body which caused distortion in one or both of these.

Therefore, by eliminating over-travel and overshooting of the header, undesirable strain has been eliminated. In the present case over-travel is eliminated by adjusting the linkage connection between the power unit and the frame of the folding top after installation on the body of the folding top and power unit.

With the foregoing general remarks in mind, it is an object of the present invention to provide a power operated convertible or folding top for a motor vehicle in which the power unit has a normal travel and includes means preventing over-travel, and adjustable means for interconnecting the power unit to the folding frame so as to properly correlate the raised position of the top with one limiting position of the power unit and to correlate the lowered position with the other limiting position of the power unit.

It is a further object of the present invention to provide apparatus of the character described including a pair of interconnected links interconnecting the power unit and folding top, and means for adjusting the effective lengths of said links to correlate the raised and lowered position of the top with limiting positions of the power unit.

It is a further object of the present invention to provide apparatus of the character described including a pair of independently adjustable links interconnecting the power unit and folding top, in which adjustment of either link is ineffective to introduce substantial variation in the operation of the other link.

Other objects and features of the invention will become apparent as the description proceeds, especially when taken in conjunction with the accompanying drawings, wherein:

Figure 1 is a side elevation of a convertible top and power unit for actuating the same, showing the top in raised position.

Figure 2 is a view similar to Figure 1 showing the top in lowered position.

Figure 3 is an enlarged fragmentary side elevation showing a portion of the top, the power unit, and linkage, with the parts in position corresponding to raised position of the top.

Figure 4 is a view similar to Figure 3 showing the parts in position corresponding to lowered position of the top.

Figure 5 is a sectional view on the line 5—5, Figure 3.

Figure 6 is a fragmentary sectional view on the line 6—6, Figure 4.

Referring now to the drawings, there is shown at 10 in Figure 1 a convertible top for a motor vehicle, this top including a frame comprising a pillar 12 pivoted at 14, a rear side rail 16 pivoted to the pillar at 18, and a front side rail 20 pivoted to the rear side rail 16 at 22. Suitable linkage is provided for actuating the elements of the folding top and this includes a balancing link 24 mounted on a fixed pivot 26 and connected at 28 to an arm 30 carried by the rear side rail. The pillar includes an extension 32 to which a link 34 is pivoted as indicated at 36, the link 34 being pivoted as indicated at 38 to a guide link 40 for the rear side rail 16. A guide link 42 for the front side rail 20 is pivoted thereto as indicated at 44 and has its rear end pivoted to the forward end of the link 40 as indicated at 46. Extending transversely of the vehicle is a header 48 which engages the windshield header 50 when the top is in raised position.

Carried by cross bows 52 and 54 is the fabric top 56.

Means are provided for raising and lowering the folding top and this means includes a power unit indicated at 60. In the present embodiment of the invention the power unit 60 is illustrated as in the form of a piston and cylinder device mounted for rocking movement on a bracket 62, the piston (not shown) being connected to a piston rod 64 which is connected to one end of an upper power link 66 as indicated at 68. The other end of the link 66 is pivoted to the pillar 12 as indicated at 70. A lower power link 72 is pivoted at one end as indicated at 74 to a stationary pivot, and at its opposite end as indicated at 76, to an intermediate point on the upper power link 66.

The same parts are illustrated in Figure 2 in which figure the top is shown in its lowered position, and similar reference numerals have been applied to the figure.

Referring now to Figure 3 there is illustrated an enlarged fragmentary side view of the power unit, the links, and the pillar of the top. In this figure the pillar 12 is illustrated in its upper or raised position to which position it has been raised by outward movement of the piston rod 64 acting on the upper link 66. The lower link 72, which is pivoted to the body as indicated at 74, has the pivot connection 76 substantially centrally of the link 66 and thereby serves to control the movement of the top to its raised position as the power unit 60 is operated. The link 66 as previously described, is pivoted to the pillar 12 at 70.

Referring now to Figure 5 it will be observed that the link 72 is constructed and arranged to provide for adjustment of its effective length. The link 72 is composed of a pair of elongated elements 80 and 82 to bring opposite ends of the elements 80 and 82 into alignment. The means for adjusting the effective length of the link 72 comprises a serrated surface 86 at the inner end of the member 80, and a correspondingly serrated surface 88 at the inner end of the member 82. The element 80 is provided with elongated openings 90 and the element 82 is provided with tapped openings 92 for the reception of bolts 94.

Obviously, by loosening the bolts 94 it will be possible to provide relative adjustment between the members 80 and 82 longitudinally of the link 72 and thereby to vary the effective length thereof.

In Figure 4 the parts are shown in the position which they assume when the top is lowered and in this figure it will be observed that the link 72 is substantially at right angles to the link 66.

In Figure 6 there is shown a sectional view through the construction illustrating the mechanism for adjusting the effective length of the link 66. As seen in this figure the piston rod 64 at its outer end carries spaced jaws 100 and 102 which are apertured as indicated at 104 for the reception of a bolt 106 adapted to be secured in position with a nut 108. Received between the jaws 100 and 102 are a pair of elongated washers 110 which are apertured to receive the bolt 106 and which have serrated inner surfaces 112. The link 66 is provided with an elongated opening 114 and adjacent its end the opposite surfaces thereof are serrated as indicated at 116. It will thus be apparent that when the nut 108 is loosened and washers 110 may be separated sufficiently to permit longitudinal adjustment of the link 66 and after such adjustment, the nut 108 may be tightened and thereafter interconnects the washers 110 to operate as a rigid extension on the link 66. Rocking movement of the link 66 and washers 110 takes place about the axis of the bolt 106.

It will be understood that the present invention is concerned primarily with a power unit of any convenient type which however, includes a member movable through a predetermined stroke and having associated therewith means which effectively prevent over-travel and determine a definite limiting position of the movable member at each end of the stroke.

In order to connect the illustrated parts in properly operative position, the folding top of the vehicle is placed in its raised position at which time the pillar 12 is in a definite predetermined position. Power is applied to the power unit to cause the movable member, in this case the piston rod 64 thereof, to reach its limiting position which corresponds to raised position of the top. At this time the bolts 94 are loose so that the link 72 is extended to the proper length and with the parts remaining in this position the bolts 94 are tightened down to interlock members 80 and 82 and to thereby maintain the link 72 in its proper relation.

Thereafter, the top is moved to its fully lowered position at which time the nut 108 is loosened so as to adjust the length of the link 66. With the piston rod 64 in its limiting position corresponding to lowered position of the top and with the top in its desired lowered position, the nut 108 is tightened, thus establishing the operative length of the link 66.

Thereafter, as the power unit is operated to raise and lower the folding top, the power unit is permitted to take its full normal stroke and when it reaches its definitely limiting position at either end of the stroke the folding top will be in exactly desired raised or lowered position.

Attention is directed to the fact that when the length of the link 72 has been adjusted to properly correlate the raised position of the piston rod 64 with the raised position of the top pillar 12, subsequent adjustment of the length of the link 66 to bring about proper correlation between the other limiting position of the piston rod 64 and the downward or lowered position of the pillar 12 may be accomplished without affecting the relationship which controls the position of the top in its up or raised position. In other words, by first adjusting the effective length of the link 72 to bring about the proper correlation between the power unit and the raised position of the top, it is possible thereafter to adjust the effective length of the link 66 without disturbing the effectiveness of the previous setting. This is because with the parts in the relationship illustrated in Figure 4, the variation in length of the link 66 has no effect on the link 72. Moreover, with the top in its raised position illustrated in Figure 3 it will be observed that link 66 is substantially at right angles to the piston rod 64 and that therefore any adjustments of the pivot 68 made by adjusting link 66 with the washers 110 does not introduce any appreciable change in setting of the position of the pillar 12.

It is thus possible in completing installation of the top and power unit to adjust the linkage interconnecting the power unit and top so that with the movable element of the power unit in either of its two limiting positions, the folding top will be in an exactly predetermined raised or lowered position.

The present invention is particularly important in present day vehicles where power units having very considerable force are provided, especially when it is considered that the effort of the power unit may in some portions of its stroke be relatively large, to overcome widely varying mechanical advantages. Thus, it happens that at the end of the stroke in some cases substantial excess of power is available. Without means such as disclosed herein, this excess power may cause damage to the folding top structure or portions of the vehicle with which the folding top structure comes into contact.

The drawings and the foregoing specification constitute a description of the improved folding top structure in such full, clear, concise and exact terms as to enable any person skilled in the art to practice the invention, the scope of which is indicated by the appended claims.

What I claim as my invention is:

1. A folding top for a motor vehicle comprising a folding frame movable between raised and lowered positions, said frame including a pillar pivoted to a fixed pivot on the vehicle body, a first power link pivoted at one end to said pillar, a second power link pivoted at one end to a fixed pivot on the vehicle body and pivoted to said first power link, a power unit having a drive member movable in a normal stroke, means preventing over-travel of said member, adjustable means for connecting said member to said first power link to correlate lowered position of said frame with one limiting position of said member, and adjustable means for varying the effective length of said second link to correlate the raised position of said frame with the other limiting position of said member.

2. Structure as defined in claim 1 in which said power unit comprises a piston and cylinder.

3. A folding top for a motor vehicle comprising a folding frame movable between raised and lowered positions, said frame including a pillar pivoted to a fixed pivot on the vehicle body, a first power link pivoted at one end to said pillar, a second power link pivoted at one end to a fixed pivot on the vehicle body and pivoted to said first power link intermediate the ends thereof, a power unit having a drive member movable in a normal stroke, means preventing overtravel of said member, adjustable means for connecting said member to said first power link to correlate lowered position of said frame with one limiting position of said member, and adjustable means for varying the effective length of said second link to correlate the raised position of said frame with the other limiting position of said member.

4. A folding top for a motor vehicle comprising a folding frame movable between raised and lowered positions, said frame including a pillar pivoted to a fixed pivot on the vehicle body, a first power link pivoted at one end to said pillar, a second power link pivoted at one end to a fixed pivot on the vehicle body and pivoted to said first power link intermediate the ends thereof, a power unit having a drive member movable in a normal stroke, means preventing overtravel of said member, adjustable means for connecting said member to said first power link adjacent the other end thereof to correlate lowered position of said frame with one limiting position of said member, and adjustable means for varying the effective length of said second link to correlate the raised position of said frame with the other limiting position of said member.

5. In a folding top, a pillar pivoted at one end to a fixed pivot, a power unit having a member movable between fixed limiting positions, a first link pivotally connected at opposite ends to said pillar and member respectively, a second link pivoted at one end to a fixed pivot and pivoted at its other end to said first link intermediate the ends of said first link, adjustable means for varying the length of one of said links to correlate the limiting position of said member with the fully raised position of said pillar, and adjustable means independent of said first adjustable means for varying the length of the other of said links to correlate the limiting position of said member with the fully lowered position of said pillar.

6. Structure as defined in claim 5 in which said power unit comprises a piston and cylinder device, and said member is the piston thereof, said piston terminating at its outer end in spaced jaws, washers within said jaws having inwardly confronting serrated surfaces, the adjacent end of said first link having serrated surfaces engageable with said washers in different positions of adjustment longitudinally of said first link, and a bolt extending through said jaws and washers and forming a pivot mounting for said first link relative to said piston.

References Cited in the file of this patent
UNITED STATES PATENTS

| | | |
|---|---|---|
| 264,452 | Giebel | Sept. 19, 1882 |
| 2,580,487 | Vigmostad | Jan. 1, 1952 |
| 2,617,681 | Hawver et al. | Nov. 11, 1952 |